United States Patent
Aoki et al.

(10) Patent No.: US 10,950,267 B1
(45) Date of Patent: Mar. 16, 2021

(54) HAMR MEDIA TO ASSIST OPTICALLY TRANSPARENT BUILD-UP ON NFT TO IMPROVE RELIABILITY

(71) Applicant: Western Digital Technologies, Inc., San Jose, CA (US)

(72) Inventors: Yuichi Aoki, Tokyo (JP); Yukio Kato, Kanagawa-ken (JP); Kosuke Nagase, Kanagawa-ken (JP); Kiyoshi Hashimoto, Kanagawa-ken (JP); Huaming Xu, Santa Clara, CA (US); Qing Dai, San Jose, CA (US); Sukumar Rajauria, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/805,403

(22) Filed: Feb. 28, 2020

(51) Int. Cl.
| | | |
|---|---|---|
| *G11B 5/72* | (2006.01) | |
| *G11B 5/73* | (2006.01) | |
| *G11B 5/40* | (2006.01) | |
| *G11B 5/71* | (2006.01) | |
| *G11B 5/00* | (2006.01) | |

(52) U.S. Cl.
CPC ............ *G11B 5/73915* (2019.05); *G11B 5/40* (2013.01); *G11B 5/71* (2013.01); *G11B 5/72* (2013.01); *G11B 5/7266* (2020.08); *G11B 2005/0021* (2013.01)

(58) Field of Classification Search
None
See application file for complete search history.

(56) References Cited

U.S. PATENT DOCUMENTS

| | | |
|---|---|---|
| 1,026,202 A | 5/1912 | Clawson |
| 5,768,056 A | 6/1998 | Boutaghou et al. |
| 6,303,280 B1 | 10/2001 | Matsunaga et al. |
| 8,760,980 B2 | 6/2014 | Zhang et al. |
| 8,934,198 B2 | 1/2015 | Zou et al. |

(Continued)

OTHER PUBLICATIONS

International Search Report issued in corresponding International Patent Application No. PCT/US2020/034788, dated Jul. 29, 2020 (9 pages).

(Continued)

*Primary Examiner* — Jefferson A Evans
(74) *Attorney, Agent, or Firm* — Patterson & Sheridan, LLP; Steven H. Versteeg (57) ABSTRACT

The present disclosure relates to a magnetic recording medium for a magnetic media drive. Absorbing smears can develop on magnetic recording heads during operation. The absorbing smears lead to shortened drive lifetime. Transparent smears, on the other hand, do not have as deleterious of an impact on drive lifetime as compared to absorbing smears. By doping the medium with a dopant that can lead to development of transparent smears, the formation of absorbing smears can be reduced or even eliminated, which leads to a longer drive lifetime. The dopant can be disposed in the capping layer of the medium or in the absorbing overcoat layer. The dopant will migrate through the medium to the top surface of the medium during operation. From the top surface of the medium, the dopant will deposit on the magnetic head and form a transparent smear.

20 Claims, 5 Drawing Sheets

(56) References Cited

U.S. PATENT DOCUMENTS

| | | |
|---|---|---|
| 9,036,307 B1 | 5/2015 | Hoshiya et al. |
| 9,251,837 B2 | 2/2016 | Zhu et al. |
| 9,601,140 B1 | 3/2017 | Rajauria |
| 9,779,771 B1* | 10/2017 | Wang .................. G11B 5/653 |
| 9,940,953 B1* | 4/2018 | Zavaliche ............... G11B 5/40 |
| 10,269,382 B1 | 4/2019 | Zavaliche et al. |
| 2005/0282038 A1* | 12/2005 | Yamamoto ............. G11B 5/72 428/834 |
| 2012/0105996 A1 | 5/2012 | Katine et al. |
| 2014/0168817 A1* | 6/2014 | Choe ..................... G11B 5/656 360/234.3 |
| 2015/0044510 A1* | 2/2015 | Carpick ................. C23C 16/50 428/835.1 |
| 2015/0124350 A1* | 5/2015 | Do ........................... G11B 5/66 360/75 |
| 2015/0262603 A1* | 9/2015 | Tonooka ............. G11B 5/7379 428/828 |
| 2016/0267935 A1* | 9/2016 | Ikeda ................... G11B 5/667 |
| 2017/0194368 A1* | 7/2017 | Roy ...................... G01S 7/4863 |
| 2017/0221511 A1 | 8/2017 | Dai et al. |
| 2018/0233166 A1 | 8/2018 | Brand et al. |
| 2019/0080713 A1* | 3/2019 | Ozyilmaz ............. C23C 16/483 |
| 2020/0010619 A1* | 1/2020 | Minami ........... C08G 65/33396 |
| 2020/0219534 A1* | 7/2020 | Jones .................... C23C 14/083 |

OTHER PUBLICATIONS

International Search Report and Written Opinion issued in corresponding International Patent Application No. PCT/US2020/035133, dated Jul. 29, 2020 (11 pages).

Xiong, Shaomin et al.; "Smear removal/mitigation by approaching head disk proximity"; https://priorart.ip.com/IPCOM/000246812, Jul. 1, 2016 (3 pages).

Xiong, Shaomin, "Head-disk Interface Study for Heat Assisted Magnetic Recording (HAMR) and Plasmonic Nanolithography for Patterned Media"; UC Berkley Electronic Theses and Dissertations, https://escholarship.org/uc/item/0g8197fc, 2014 (185 pages).

Zhong, Chuan et al.; "Effective heat dissipation in an adiabatic near-field transducer for HAMR"; Optics Express, vol. 26, No. 15, Jul. 23, 2018 (13 pages).

* cited by examiner

HAMR MEDIA TO ASSIST OPTICALLY TRANSPARENT BUILD-UP ON NFT TO IMPROVE RELIABILITY

BACKGROUND OF THE DISCLOSURE

Field of the Disclosure

Embodiments of the present disclosure generally relate to a magnetic recording medium for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium. The NFT temperature has a direct impact on device reliability. A high NFT temperature will lead to lower lifetime/reliability. Additionally, the HAMR interface will accumulate material on the NFT. This accumulated material is oftentimes referred to as a smear. The smear contains absorbing material which increases the NFT temperature.

Therefore, there is a need in the art for an improved magnetic media drive that reduces or eliminates the absorbing smear on the NFT.

SUMMARY OF THE DISCLOSURE

The present disclosure relates to a magnetic recording medium for a magnetic media drive. Absorbing smears can develop on magnetic recording heads during operation. The absorbing smears lead to shortened drive lifetime. Transparent smears, on the other hand, do not have as deleterious of an impact on drive lifetime as compared to absorbing smears. By doping the medium with a dopant that can lead to development of transparent smears, the formation of absorbing smears can be reduced or even eliminated, which leads to a longer drive lifetime. The dopant can be disposed in the capping layer of the medium or in the carbon based overcoat layer. The dopant will migrate through the medium to the top surface of the medium during operation. From the top surface of the medium, the dopant will deposit on the magnetic head and form a transparent smear.

In one embodiment, a magnetic recording medium comprises: a substrate; a magnetic recording layer disposed over the substrate; at least one capping layer disposed on the magnetic recording layer, wherein the at least one capping layer is doped with a dopant, wherein the dopant comprises a material that is transparent in a wavelength range of between about 800 nm and about 900 nm; and a carbon containing layer disposed over the at least one capping layer.

In another embodiment, a magnetic recording medium comprises: a substrate; an adhesion layer disposed on the substrate; an intermediate layer disposed on the adhesion layer; a magnetic recording layer disposed on the intermediate layer; at least one capping layer disposed on the magnetic recording layer; an overcoat layer disposed over the at least one capping layer, wherein the overcoat layer is doped with a dopant, wherein the dopant comprises between about 2 percent and about 10 percent of the overcoat layer; and a lubricant layer disposed on the overcoat layer.

In another embodiment, a magnetic recording medium comprises: a substrate; at least one capping layer disposed over the substrate; a carbon containing overcoat layer disposed on the at least one capping layer; and means to deposit a transparent smear on a magnetic recording head, wherein the means to deposit a transparent smear on a magnetic recording head is disposed in one or more of the at least one capping layer and the carbon containing overcoat layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a magnetic recording medium for a magnetic media drive. Absorbing smears can develop on magnetic recording heads during operation. The absorbing smears lead to shortened drive lifetime. Transparent smears, on the other hand, do not have as deleterious of an impact on drive lifetime as compared to absorbing smears. By doping the medium with a dopant that can lead to development of transparent smears, the formation of absorbing smears can be reduced or even eliminated, which leads to a longer drive lifetime. The dopant can be disposed in the capping layer of the medium or in the carbon based overcoat layer. The dopant will migrate through the medium to the top surface of the medium during operation. From the top surface of the medium, the dopant will deposit on the magnetic head and form a transparent smear.

Figure 1:
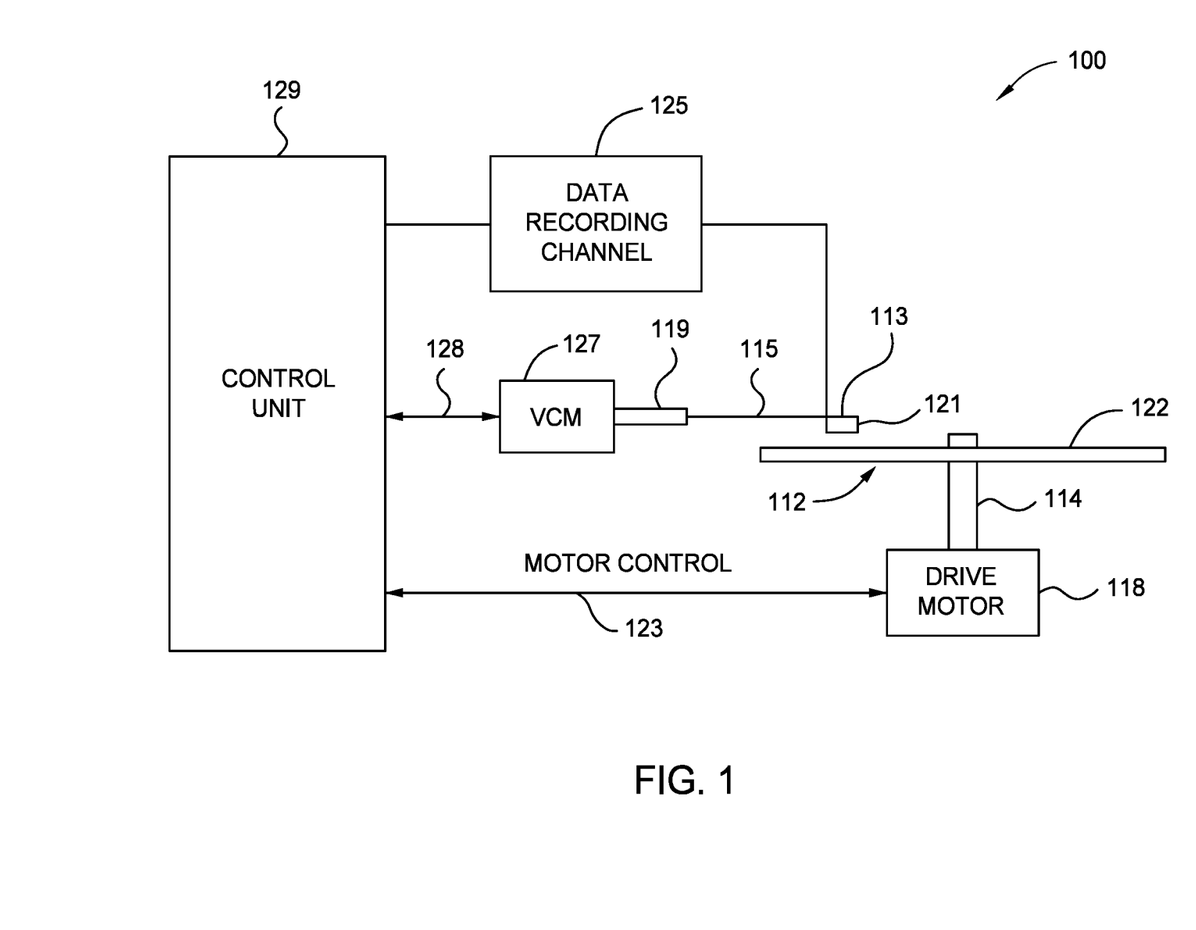
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
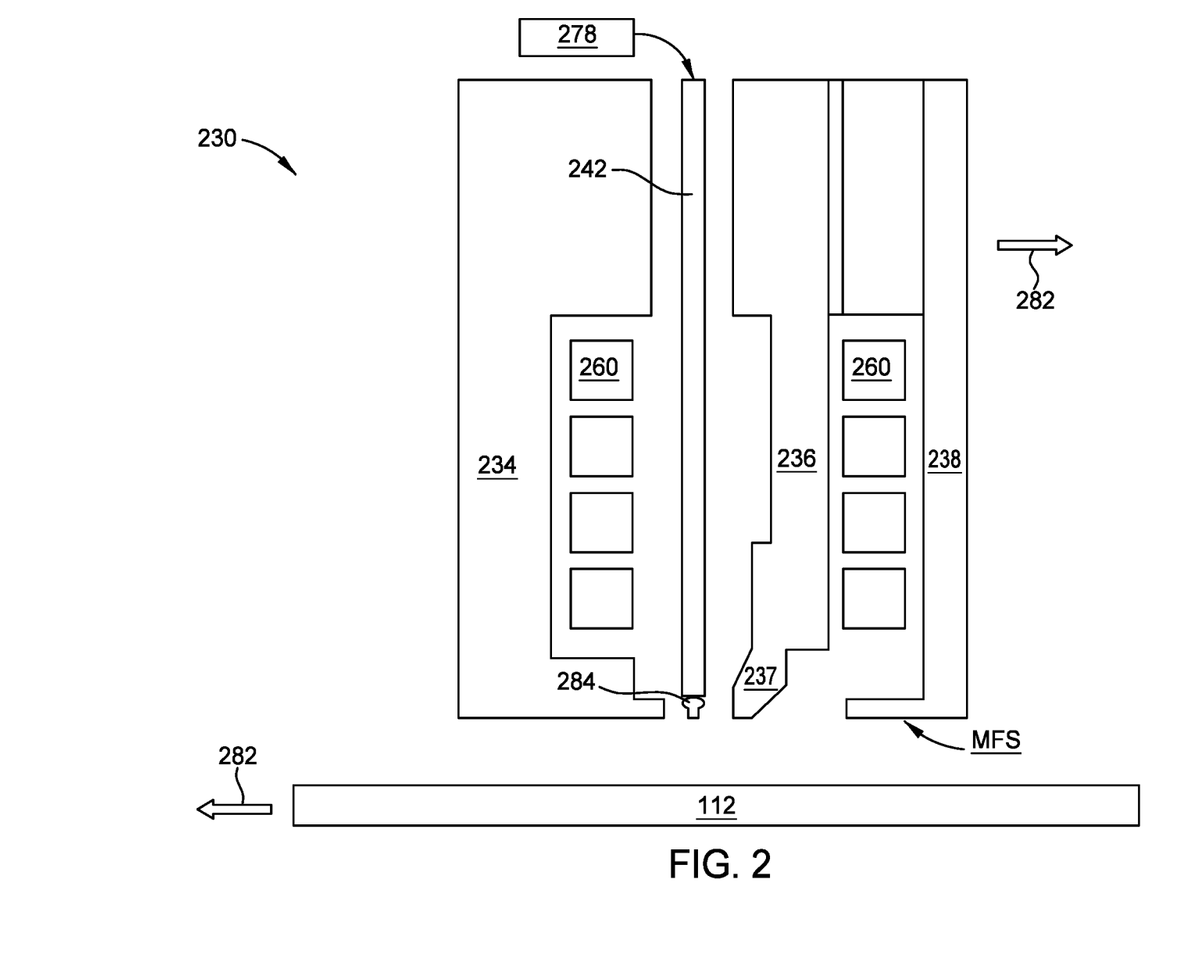
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282.

The HAMR write head 230 includes a main pole 236 disposed between a leading shield 234 and a trailing shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading shield 234 and/or the trailing shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the focal point of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS heating a precise area of the NFT 284 which in turn heats a precise area of the magnetic disk 112. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The NFT temperature has a direct impact on disk drive reliability. A high NFT temperature leads to a lower lifetime and lower reliability. Conversely, a lower NFT temperature leads to a longer device lifetime and higher reliability. During operation, the HAMR interface accumulates material on the NFT. The material is referred to as a smear. The smear has two components: an absorbing material and a non-absorbing material. The absorbing material increases the NFT temperature. The non-absorbing material, on the other hand, is transparent. The non-absorbing material contains silicon or an oxide and does not increase the temperature of the NFT. The ratio of absorbing material to non-absorbing material depends upon various parameters such as the magnetic medium fabrication, the magnetic medium layers.

Figure 3A:
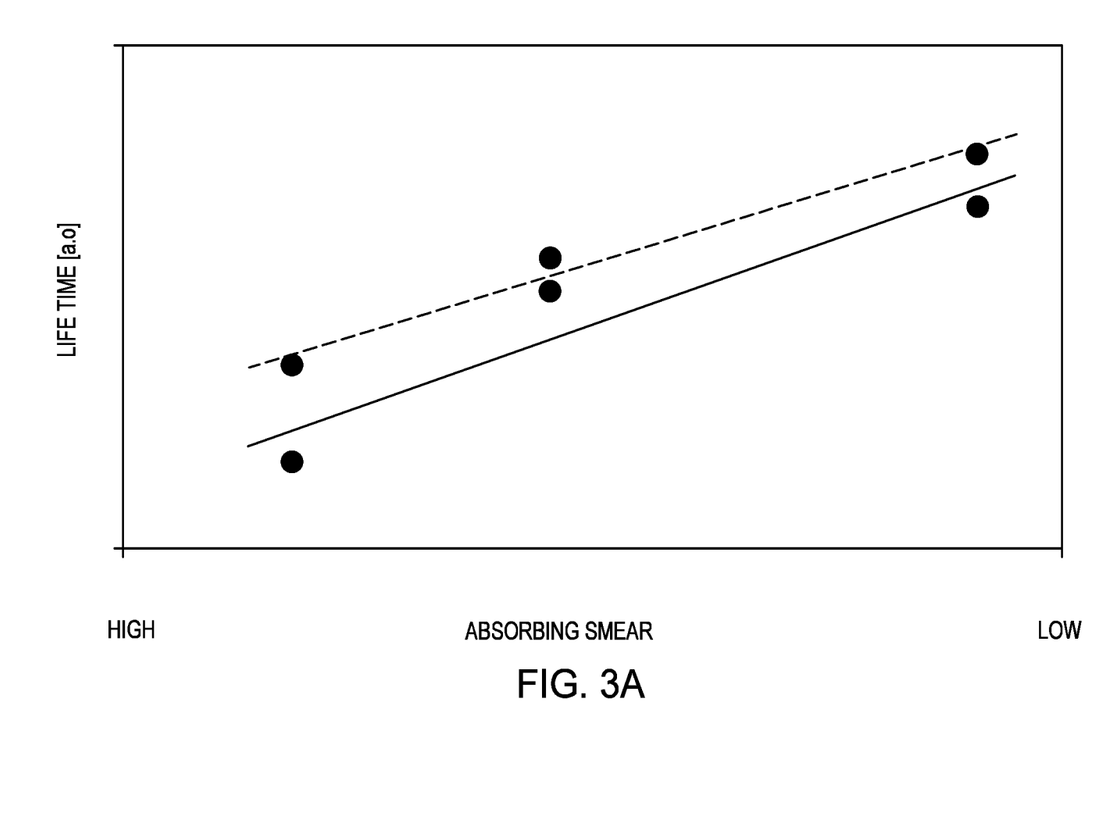
FIG. 3A is a graph illustrating the impact of absorbing smear on device lifetime.

FIG. 3A is a graph illustrating the impact of absorbing smear on device lifetime. The absorbing smear can increase the NFT temperature by more than 50 K and the cladding temperature by greater than 200K. The non-absorbing smear, on the other hand, does not increase the NFT or cladding temperature. A natural thought would be to simply not form any smear on the recording head. However, in practice, simply not forming any smear is not an option. A smear will naturally form, and there is only so much smear that can actually form. In other words, a smear will form, but the smear will not have an unlimited thickness. Thus, because a smear will form, it would be beneficial to form a non-absorbing smear, but not form (or form as little as possible) an absorbing smear. Therefore, selectively forming the non-absorbing or transparent smear on the NFT is desired.

Figure 3B:
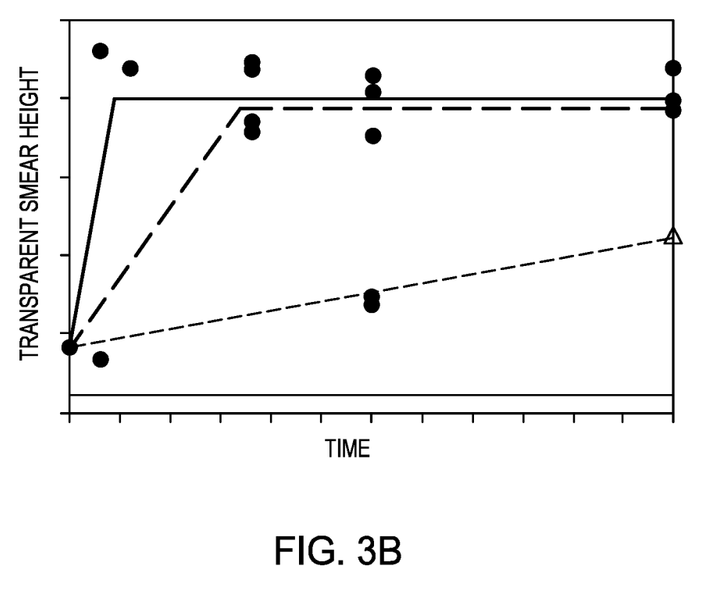
FIG. 3B is a graph illustrating the growth of a transparent smear.

FIG. 3B is a graph illustrating the formation of transparent smear on head. As shown in FIG. 3B, the smear height is saturated by the clearance. The three different lines show the speed with which the non-absorbing smear is formed. The slower that the non-absorbing smear forms, the higher the likelihood that the absorbing smear will form. Thus, the fastest forming non-absorbing smear in FIG. 3B will have the least absorbing smear formation and thus, the longest lifetime. The slowest forming non-absorbing smear in FIG. 3B will have the most absorbing smear formation and thus, the shortest lifetime.

The smear is formed from material that is present in the magnetic recording medium that deposits on the magnetic recording head during operation. Therefore, the non-absorbing or transparent material that forms the non-absorbing or transparent smear on the magnetic recording head is present in the magnetic recording medium. Additional non-absorbing or transparent material in the magnetic recording medium is beneficial in selectively forming the non-absorbing or transparent smear. Selectively doping the non-absorbing or transparent material into the magnetic recording medium is manner to provide the additional non-absorbing or transparent material to the magnetic recording medium.

Figure 4A:
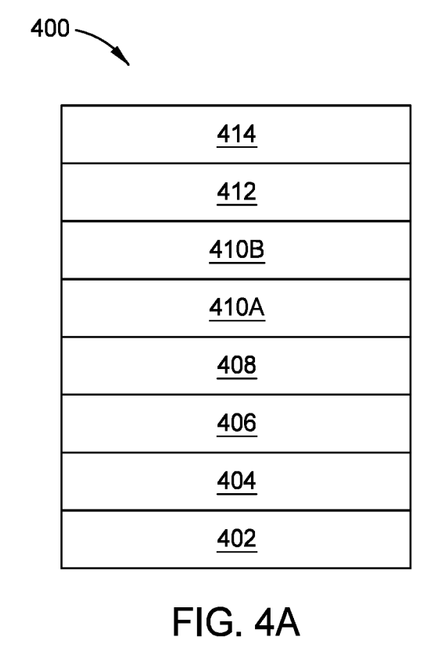
FIG. 4A is a schematic illustration of a magnetic recording medium according to one embodiment.

FIG. 4A is a schematic illustration of a magnetic recording medium 400 according to one embodiment. The medium 400 includes a substrate 402 may comprise a material selected from the group consisting of aluminum allow, NiP plated aluminum, glass, ceramic material, and combinations thereof.

An adhesion layer 404 is disposed on the substrate 402. Suitable materials for the adhesion layer 404 include CrTi, CrTa, NiTa, CoCrTaZr, CoFeZrBCr, CoTaZr, CoFeTaZr, CoCrWTaZr, CoCrMoTaZr, CoZrWMo, and combinations thereof.

An intermediate layer 406 is disposed on the adhesion layer 404. Suitable materials for the intermediate layer 406 include Cr, Mo, Ru, RuAl, MgO, W, CuZr, MoCu, AgPd, CrRu, CrV, CrW, CrMo, CrNd, NiAl, NiTa, CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, where X may be selected from a group including $SiO_2$ and $ZrO_2$.

A magnetic recording layer 408 is disposed on the intermediate layer 406. Suitable materials for the magnetic recording layer 408 include FePt or other ferromagnetic material alloy.

One or more capping layers 410A, 410B are disposed on the magnetic recording layer 408. In one embodiment, a single capping layer is present. FIG. 4A illustrates two capping layers 410A, 410B, but it is to be understood that additional capping layers may be present. Regardless of whether a single capping layer is used or multiple capping layers are used, suitable material for the capping layer(s) 410A, 410B include CoPt, FePt, Co, and combinations thereof.

The capping layer(s) 410A, 410B include dopant that will be the source of the non-absorbing or transparent material for the non-absorbing or transparent smear. Suitable materials for the dopant include silicon and oxides. Suitable oxides may be selected from the group consisting of silicon oxide, silicon dioxide, tantalum oxide, titanium oxide, and combinations thereof. The dopant is transparent in a wavelength range of between about 800 nm and about 900 nm. The dopant is present in an amount of between about 2 percent and about 10 percent of the capping layer(s) 410A, 410B, such as about 5 percent. When there is a single capping layer, the dopant is doped into the layer. When the capping layer is a multi-layer structure, the dopant may be disposed in the first capping layer 410A or in the second capping layer 410B. In one embodiment, the dopant may be disposed in both the first capping layer 410A and the second capping layer 410B. The dopant is doped into the capping layer(s) 410A, 410B prior to forming of additional layers over the capping layer(s) 410A, 410B.

An overcoat layer 412 is disposed on the capping layer(s) 410A, 410B. Suitable material for the overcoat layer 412 include diamond-like-carbon (DLC). A lubricant layer 414 is disposed on the overcoat layer 412. Suitable materials that may be used for the lubricant layer 414 include polymer based materials.

Figure 4B:
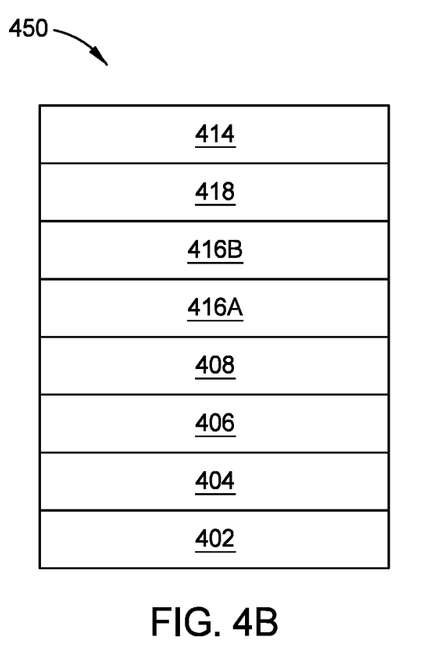
FIG. 4B is a schematic illustration of a magnetic recording medium according to another embodiment.

Rather than doping the capping layer(s) 410A, 410B, the dopant may be doped directly into the overcoat layer. FIG. 4B is a schematic illustration of a magnetic recording medium 450 according to another embodiment. In the embodiment of FIG. 4B, the overcoat layer 418 has a dopant therein. Suitable dopants are discussed above with regards to FIG. 4A. The capping layer(s) 416A, 416B are not doped, but rather, simply comprise materials selected from the group consisting of CoPt, FePt, Co, and combinations thereof.

It is contemplated that both the capping layer(s) and the overcoat layer may have dopant therein. Furthermore, it is contemplated that the dopant may be in one of more of the following locations: the capping layer (if only one capping layer is present), the overcoat layer, the first capping layer (if multiple capping layers are present), the topmost capping layer (if multiple capping layers are present), all capping layers (if multiple capping layers are present), and combinations thereof. For example, it is contemplated that dopant may be present in either the first or second capping layer as well as the overcoat layer. The dopant, regardless of which layer the dopant originates, moves to the top of the magnetic recording medium and eventually deposits on the magnetic recording head during operation.

In one embodiment, a magnetic recording medium comprises: a substrate; a magnetic recording layer disposed over the substrate; at least one capping layer disposed on the magnetic recording layer, wherein the at least one capping layer is doped with a dopant, wherein the dopant comprises a material that is transparent in a wavelength range of between about 800 nm and about 900 nm; and a carbon containing layer disposed over the at least one capping layer. The at least one capping layer comprises a cobalt containing material. The dopant comprises a silicon containing material or an oxide. The silicon containing material is a silicon oxide. The dopant comprises between about 2 percent and about 10 percent of the at least one capping layer. The at least one capping layer comprises a first capping layer and a second capping layer disposed on the first capping layer, wherein the carbon containing layer is disposed on the second capping layer. The dopant is disposed in the second capping layer. In the embodiment, a magnetic media drive comprises the magnetic recording medium.

In another embodiment, a magnetic recording medium comprises: a substrate; an adhesion layer disposed on the substrate; an intermediate layer disposed on the adhesion layer; a magnetic recording layer disposed on the intermediate layer; at least one capping layer disposed on the magnetic recording layer; an overcoat layer disposed over the at least one capping layer, wherein the overcoat layer is doped with a dopant, wherein the dopant comprises between about 2 percent and about 10 percent of the overcoat layer; and a lubricant layer disposed on the overcoat layer. The overcoat layer comprises a carbon containing material. The dopant comprises an oxide. The oxide is selected from the group consisting of silicon oxide, silicon dioxide, tantalum oxide, titanium oxide, and combinations thereof. The dopant comprises a material that is transparent in a wavelength range of between about 800 nm and about 900 nm. The dopant comprises a silicon containing material. The overcoat layer comprises diamond-like-carbon. In the embodiment, a magnetic media drive comprises the magnetic recording medium.

In another embodiment, a magnetic recording medium comprises: a substrate; at least one capping layer disposed over the substrate; a carbon containing overcoat layer disposed on the at least one capping layer; and means to deposit a transparent smear on a magnetic recording head, wherein the means to deposit a transparent smear on a magnetic recording head is disposed in one or more of the at least one capping layer and the carbon containing overcoat layer. The transparent smear comprises a material that is transparent in a wavelength range of between about 800 nm and about 900 nm. The transparent smear comprises an oxide selected from the group consisting of silicon oxide, silicon dioxide, tantalum oxide, titanium oxide, and combinations thereof. In the embodiment, a magnetic media drive comprises the magnetic recording medium.

By using a dopant in the magnetic media, a transparent smear may be formed on the magnetic recording head and thus increase the lifetime of the magnetic media drive.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording medium, comprising:
   a substrate;
   a magnetic recording layer disposed over the substrate;
   at least one capping layer disposed on the magnetic recording layer, wherein the at least one capping layer is doped with a dopant, wherein the dopant comprises a material that is transparent in a wavelength range of between about 800 nm and about 900 nm; and
   a carbon containing layer disposed over the at least one capping layer.

2. The magnetic recording medium of claim 1, wherein the at least one capping layer comprises a cobalt containing material.

3. The magnetic recording medium of claim 1, wherein the dopant comprises a silicon containing material or an oxide.

4. The magnetic recording medium of claim 3, wherein the silicon containing material is a silicon oxide.

5. The magnetic recording medium of claim 1, wherein the dopant comprises between about 2 percent and about 10 percent of the at least one capping layer.

6. The magnetic recording medium of claim 1, wherein the at least one capping layer comprises a first capping layer and a second capping layer disposed on the first capping layer, wherein the carbon containing layer is disposed on the second capping layer.

7. The magnetic recording medium of claim 6, wherein the dopant is disposed in the second capping layer.

8. A magnetic media drive comprising the magnetic recording medium of claim 1.

9. A magnetic recording medium, comprising:
   a substrate;
   an adhesion layer disposed on the substrate;
   an intermediate layer disposed on the adhesion layer;
   a magnetic recording layer disposed on the intermediate layer;
   at least one capping layer disposed on the magnetic recording layer, wherein the at least one capping layer is doped with a dopant, the dopant comprising a non-absorbing or transparent material;
   an overcoat layer disposed over the at least one capping layer, wherein the overcoat layer is doped with the dopant, wherein the dopant of the overcoat layer comprises between about 2 percent and about 10 percent of the overcoat layer; and
   a lubricant layer disposed on the overcoat layer.

10. The magnetic recording medium of claim 9, wherein the overcoat layer comprises a carbon containing material.

11. The magnetic recording medium of claim 9, wherein the dopant comprises an oxide.

12. The magnetic recording medium of claim 11, wherein the oxide is selected from the group consisting of silicon oxide, silicon dioxide, tantalum oxide, titanium oxide, and combinations thereof.

13. The magnetic recording medium of claim 9, wherein the dopant comprises a material that is transparent in a wavelength range of between about 800 nm and about 900 nm.

14. The magnetic recording medium of claim 9, wherein the dopant comprises a silicon containing material.

15. The magnetic recording medium of claim 9, wherein the overcoat layer comprises diamond-like-carbon.

16. A magnetic media drive comprising the magnetic recording medium of claim 9.

17. A magnetic recording medium, comprising:
   a substrate;
   at least one capping layer disposed over the substrate;
   a carbon containing overcoat layer disposed on the at least one capping layer; and
   means to deposit a transparent smear on a magnetic recording head, wherein the means to deposit the transparent smear on the magnetic recording head is disposed in the at least one capping layer, and wherein the transparent smear comprises a material that is transparent in a wavelength range of between about 800 nm and about 900 nm.

18. The magnetic recording medium of claim 17, wherein the transparent smear comprises an oxide selected from the group consisting of silicon oxide, silicon dioxide, tantalum oxide, titanium oxide, and combinations thereof.

19. A magnetic media drive comprising the magnetic recording medium of claim 17.

20. The magnetic recording medium of claim 17, wherein the transparent smear comprises between about 2 percent and about 10 percent of the at least one capping layer.

* * * * *